No. 759,521. Patented May 10, 1904.

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 759,521, dated May 10, 1904.

Application filed June 1, 1903. Serial No. 159,686. (No model.)

*To all whom it may concern:*

Be it known that I, ARCHIE GERRY HOHENSTEIN, a citizen of the United States, residing at New Haven, in the county of New Haven and State of Connecticut, have invented or discovered certain new and useful Improvements in Steam-Boilers, of which improvements the following is a specification.

The invention described herein relates to the embodiment of my three-tube system in forms or constructions of boilers which are especially adapted for use on small vessels.

In general terms the invention consists in the combination, with the three-tube system, of two upper drums connected to the upper water-chambers of such system. Laterally-arranged downtakes form said drums, said downtakes being connected to equalizing-boxes, which in turn are connected to the lower water-chambers; and the invention further consists in certain combinations and arrangements of elements, as hereinafter specified.

Figure 1:
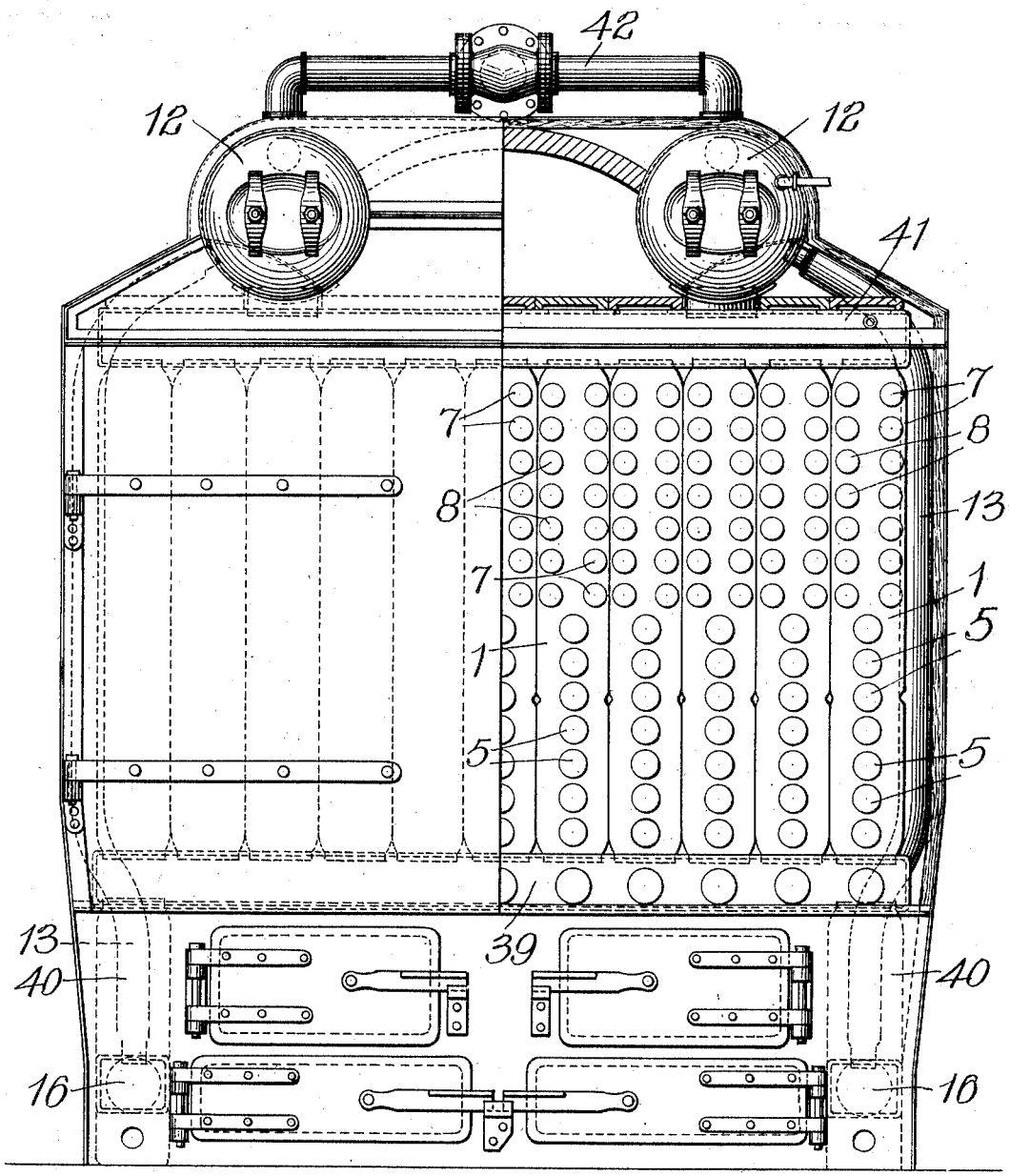
Figure 2:
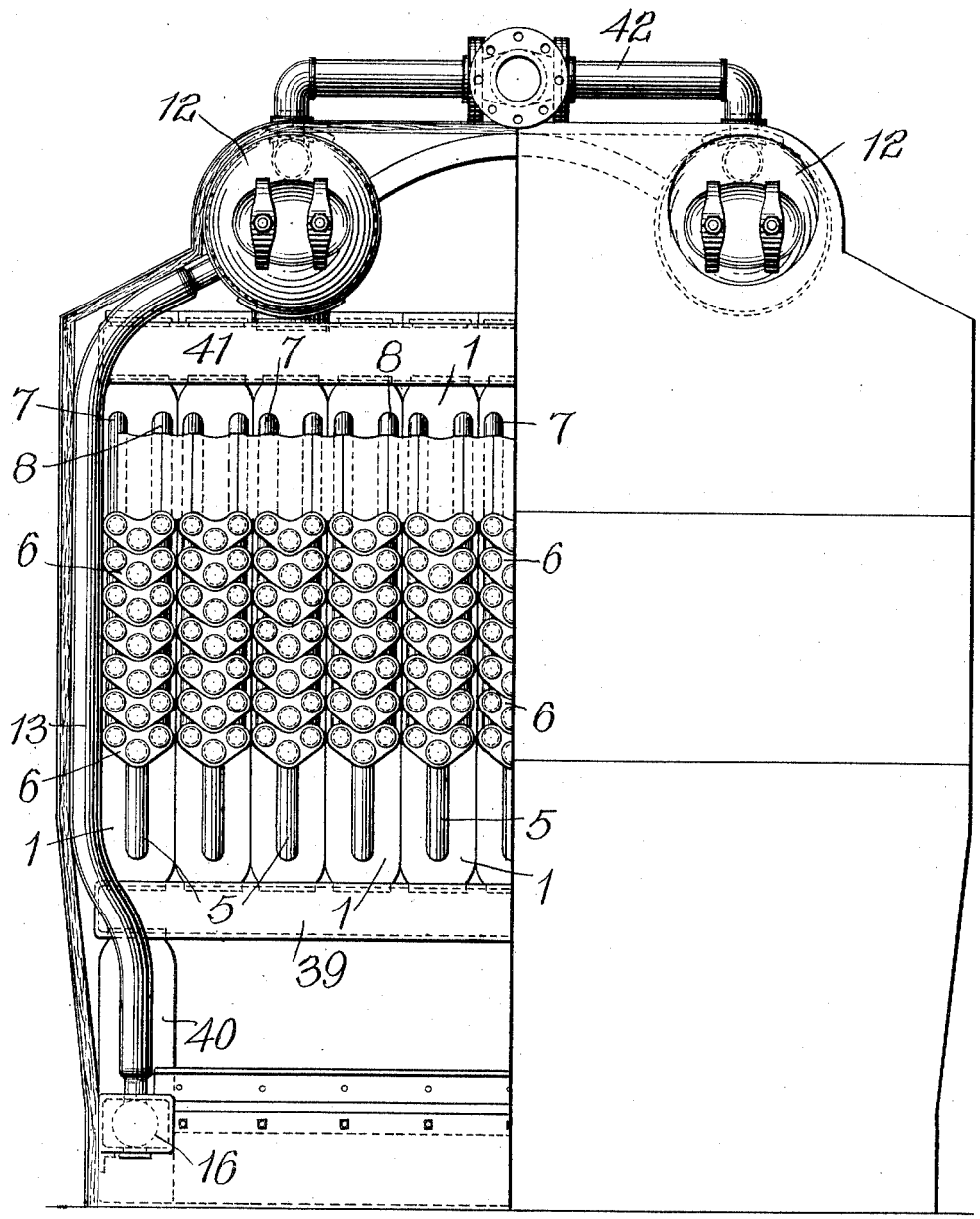
Figure 3:
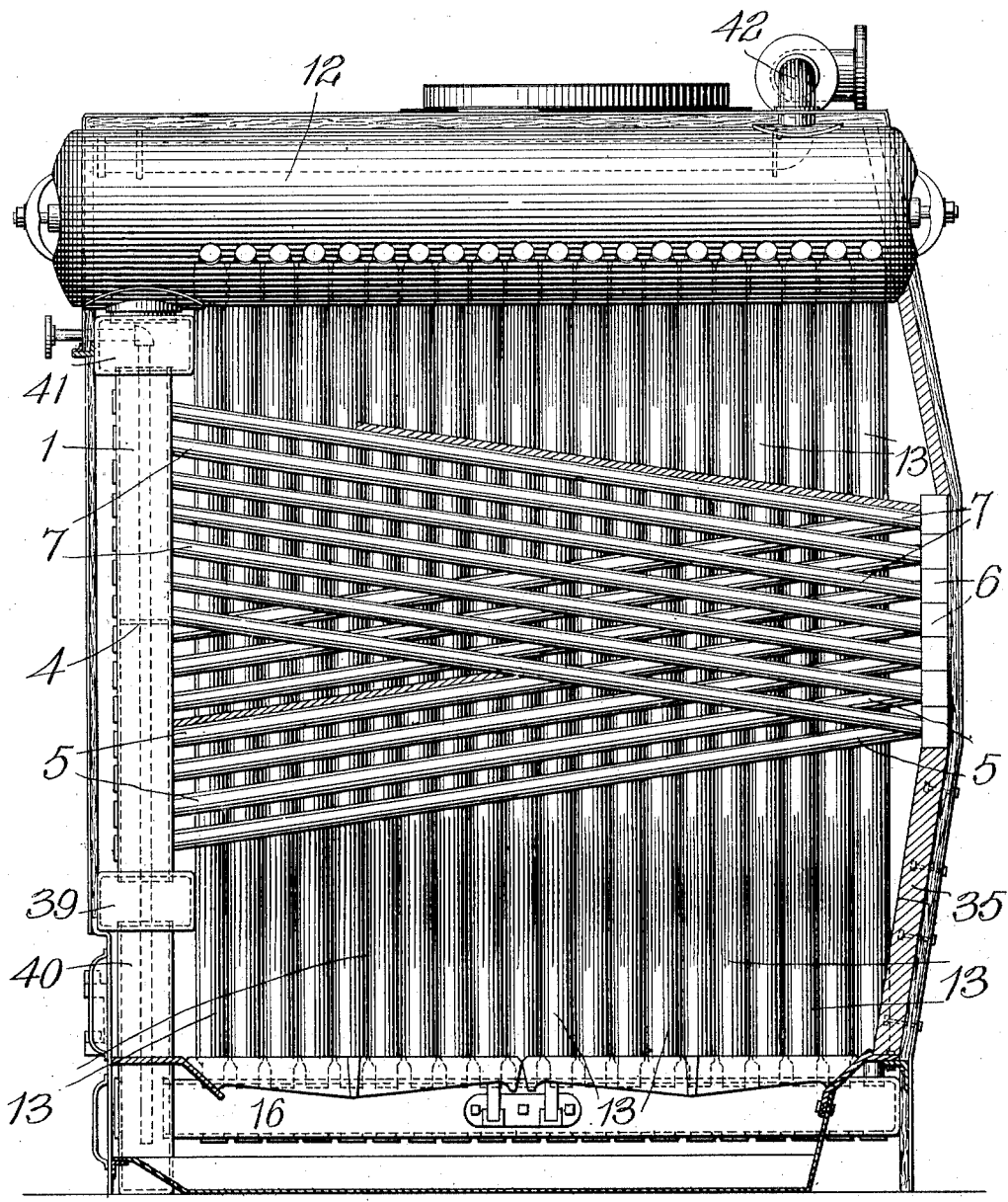

In the accompanying drawings, forming a part of this specification, Figure 1 is a front elevation of my improved boiler, part of the casing being removed. Fig. 2 is a rear elevation, a portion of the casing being removed; and Fig. 3 is a side elevation, the downtakes of the side being removed.

In the practice of my invention the front headers may be made in the form of a double header divided by a diaphragm 4 into two chambers or compartments or of two single independent headers, one directly above the other, as described and shown in application, Serial No. 159,684, filed June 1, 1903. Three series of tubes 5, 7, and 8 extend from these chambers across the boiler and have their rear ends connected by the junction-boxes 6. As stated in the application referred to, the lower series of tubes 5 it made of a capacity equal or approximately equal to the combined capacity of the two series of upper tubes 7 and 8. The headers 1 are supported by and connected to an equalizing-box 39, which in turn is connected to supporting water-legs 40. These water-legs rest upon and are connected to equalizing-boxes 16, arranged on opposite sides of the fire-box and by preference slightly below the level of the grates. The upper ends of the headers are connected to and form supports for an equalizing-box 41, which in turn is connected to and forms the support for front ends of the drums 12, which extend rearwardly and have their rear ends connected by a steam-pipe 42, which is adapted to prevent any spreading or separation of the drums at their rear ends. As these drums have both water and steam connections, they form practically one steam-breaking space, for which a single drum might be substituted. Each of these drums is connected to one of the equalizing-boxes 16 by downtakes 13. These downtakes are so constructed and connected to the drums and to the equalizing-boxes that they form practically closed water-walls for the sides of the fire-box. By this construction I obtain a full loop circulation of the water, the circulation being divided at the upper junction-box 41 and flowing by the upper drums, through the several downtakes, to the lower equalizing-boxes, thence by the supporting water-legs to the equalizing-box 39, where the circulation again unites, but is immediately separated or subdivided by the headers 1, leading from this equalizing and distributing box 39. The junction-boxes at the ends of the tubes 5, 7, and 8 are supported by a wall 35, forming the rear wall of the fire-chamber.

It is characteristic of this construction that a very large combustion-chamber is provided and that approximately all of the tubes, headers, drums, downtakes, and equalizing-boxes are employed as heating-surface.

It will be observed that the downtakes form side water-walls not only for the fire-box, but also for the combustion-chamber, so that all the walls of the fire and combustion chambers are formed by water-walls, which form parts of the circulating system.

The series of tubes 5, 7, and 8 may be reversed, the series 5 extending with a downward inclination from the upper water-chambers and the series 7 and 8 extending with an upward inclination from the lower water-chambers, as shown and described in application Serial No. 159,684, filed June 1, 1903.

I claim herein as my invention—

1. A water-tube boiler having in combination two series of water-chambers at the front of the boiler, three connected series of tubes extending from said chambers, combined steam and water drums connected to the upper water-chambers, and return connections from said drums to the lower water-chambers, a portion of said return connections forming side walls for the combustion-chamber, substantially as set forth.

2. A water-tube boiler having in combination two series of water-chambers at the front of the boiler, three connected series of tubes extending from said chambers, combined steam and water drums connected to the upper water-chambers, downtakes extending from said drums and forming side water-walls for the combustion-chamber, equalizing-boxes connected to the lower ends of the downtakes, and connections from said boxes to the lower water-chambers, substantially as set forth.

3. A water-tube boiler having in combination two series of water-chambers at the front of the boiler, three connected series of tubes extending from said chambers, combined steam and water drums connected to the upper water-chambers, downtakes extending from said drums and forming side water-walls for the combustion-chamber, equalizing-boxes connected to the lower ends of the downtakes, water-legs supported on said boxes, and an equalizing-box supported by the legs and supporting the water-chambers, substantially as set forth.

4. A water-tube boiler having in combination front headers, three connected series of tubes extending from said headers, an equalizing-box supported by said headers, two drums connected to said box, downtakes extending down from each of said drums, equalizing-boxes connected to the downtakes, water-legs resting on and connected to said boxes, and an equalizing-box supported by said legs and serving as supports for the headers, substantially as set forth.

5. A water-tube boiler having in combination two series of water-chambers at the front of the boiler, three connected series of tubes extending from said chambers, downtakes arranged to form water-walls at the sides of the boiler and having their ends connected respectively to the upper and lower water-chambers, substantially as set forth.

6. A water-tube boiler having in combination two series of water-chambers at the front of the boiler, three connected series of tubes extending from the water-chambers, an equalizing-box connected to the upper water-chambers, downtakes connected to the equalizing-chamber and arranged to form water-walls for the sides of the boiler, equalizing-boxes connected to the downtakes and to the lower water-chambers, substantially as set forth.

In testimony whereof I have hereunto set my hand.

ARCHIE G. HOHENSTEIN.

Witnesses:
DARWIN S. WOLCOTT,
J. C. DAVIDSON.